Sept. 8, 1936.  H. E. HERSHEY  2,053,774
INDICATING SYSTEM
Filed Oct. 24, 1934  4 Sheets-Sheet 1

INVENTOR
HARRY E. HERSHEY
ATTY.

Sept. 8, 1936.                H. E. HERSHEY                2,053,774
                              INDICATING SYSTEM
                           Filed Oct. 24, 1934          4 Sheets-Sheet 2

INVENTOR
HARRY E. HERSHEY
ATTY.

Sept. 8, 1936.   H. E. HERSHEY   2,053,774
INDICATING SYSTEM
Filed Oct. 24, 1934   4 Sheets-Sheet 3

INVENTOR
HARRY E. HERSHEY
ATTY.

Sept. 8, 1936.  H. E. HERSHEY  2,053,774
INDICATING SYSTEM
Filed Oct. 24, 1934   4 Sheets-Sheet 4

INVENTOR
HARRY E. HERSHEY
ATTY

Patented Sept. 8, 1936

2,053,774

UNITED STATES PATENT OFFICE 2,053,774

INDICATING SYSTEM

Harry E. Hershey, Chicago, Ill., assignor to Associated Electric Laboratories, Inc., Chicago, Ill., a corporation of Delaware Application October 24, 1934, Serial No. 749,711

3 Claims. (Cl. 177—311)

This invention relates in general to indicating systems and more particularly to a dispatcher's display board for indicating the location of different types of mobile units or apparatus.

The main object of the present invention is to provide an electrically controlled display board for indicating the presence or absence of mobile units or apparatus of different given classes at certain designated points in a mimic diagram of a given area in order to enable the operator to visualize the relative geographic location of each different unit or apparatus assigned to the area.

A feature of the invention relates to the display panel which is made up of small interchangeable squares or escutcheons, such as disclosed and described in the White Patent Number 2,010,338, issued August 6, 1935. The panel represents a given area and is divided into sections or zones. The mobile units or equipment are designated by symbols painted on one or more of the interchangeable squares. Each similar unit or equipment being represented by a like color, while dissimilar units or equipment are represented by different colors. Each symbol also being located on the panel as near as possible to its relative geographic location. Each escutcheon symbol, representative of a given type of unit or apparatus, has a small rectangular opening through which one of a plurality of numerals on a rotatable drum is visible to the operator.

Another feature relates to the means for enabling the operator to select and operate any desired drum of a symbol in any zone or section to display different digits which in combination with the color of the symbol indicates the geographic location of a particular mobile unit or apparatus.

A system of this type may be used for indicating the location of any type of mobile unit or equipment such as fire fighting apparatus, police units or apparatus, or even military maneuvers in a given area.

Municipal fire departments have long felt the need of an animated dispatch board which would continuously present to the dispatcher a graphic picture of the minute by minute distribution of the fire fighting apparatus.

Referring now to Figs. 1 to 4, inclusive, the invention will be described in connection with a municipal fire department wherein the display panel illustrates the different fire zones and the different colored symbols represent the different types of fire fighting apparatus at the different fire stations.

Figure 1:
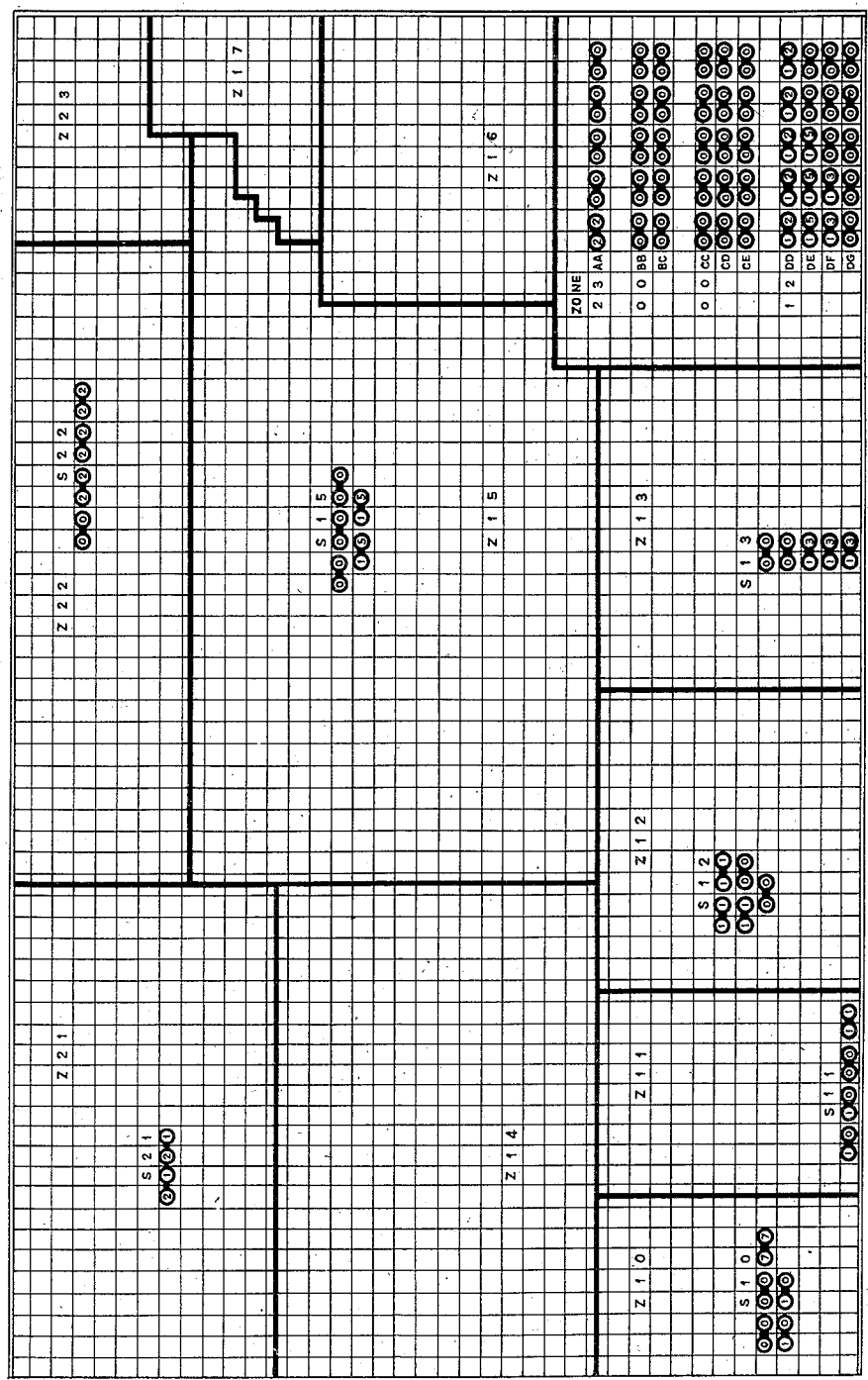
Fig. 1 shows the display panel illustrating a map or mimic diagram of the municipality divided into fire zones and an operator's or dispatcher's section in the lower right-hand corner.

Referring now in detail to Fig. 1 the area as shown is divided into eleven zones designated Z10 to Z17, inclusive, and Z21 to Z23, inclusive. Zones 10, 11, 12, 13, 15, 21 and 22 each have a fire station in the relative location shown by the symbols somewhat resembling dumb-bells and designated S10, S11, etc. Certain of the zones are outlying districts and do not have fire stations. Other zones in more congested districts have fire stations equipped with the full quota of fire fighting apparatus, while still other zones have less fire fighting equipment as indicated by the number of symbols in each station.

In the dispatcher's section in Fig. 1 there are shown four groups of symbols which are used by the dispatcher to display the particular pieces of apparatus sent to a fire in a given zone. The first group, or group AA, is used to designate the apparatus sent to outlying zones such as zone 23, where, in all probability, only one fire may be reported at a time. The lower group, or group DD to DG, is used to designate the apparatus sent to congested zones, such as 12, where in severe fires a large amount of fire fighting apparatus may be needed.

Figure 2:
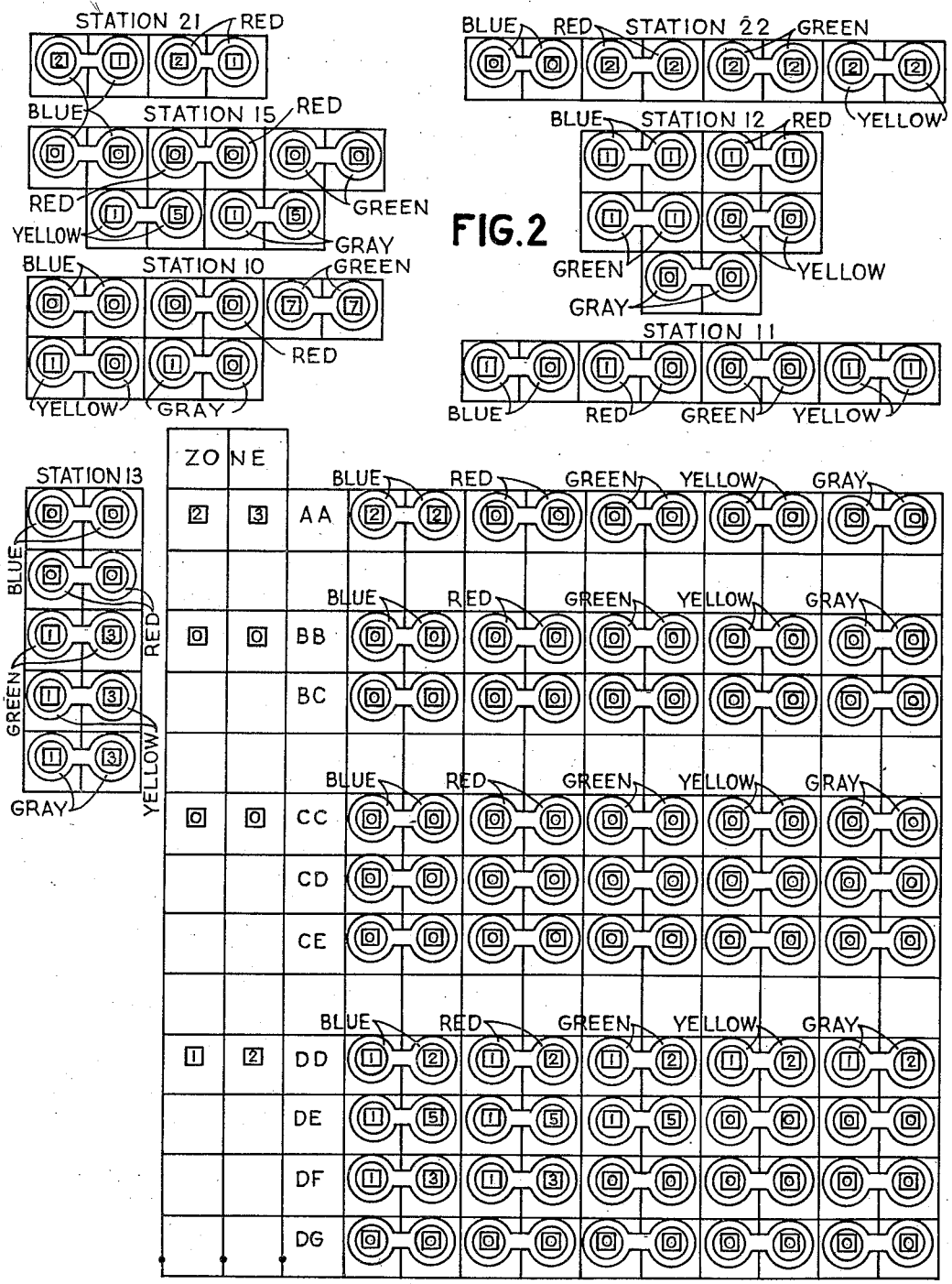
Fig. 2 shows the different fire stations with their different colored symbols representing different types of apparatus and the dispatcher's display section.

In the upper portion of Fig. 2 are shown enlarged views of the symbols of all the stations while the lower portion shows the symbols in the four groups of the dispatcher's display section. Station 21 shows two sets of different colored symbols thereby indicating that fire station 21 has two different types of standard fire fighting apparatus, hereinafter referred to as the blue and the red apparatus. Station 13 shows five sets of different colored symbols thereby indicating that fire station 13 has five different types of standard fire fighting apparatus, hereinafter referred to as the blue, red, green, yellow, and gray apparatus. The colored portion of each symbol is in the shape of a dumb-bell. Each colored symbol has a rectangular opening through which a numeral on a rotatable drum is visible. A magnet positioned behind the symbol operates the drum one step for each deenergization. An electro-mechanical signalling device of this character is disclosed in Patent No. 1,966,042 issued July 10, 1934 to H. F. Obergfell. In the above patent the rotatable drum has different colored sections on its periphery while in the instant application numerals 0–7, inclusive, instead of colors are printed on the periphery of the drum.

The numbers displayed by each symbol indicate the station such particular type of apparatus is normally assigned to. For example, the number 21 in the blue symbols of station 21 indicates that the blue apparatus of fire station 21 is at its home position or at station 21. When the digits 0–0 are displayed then such apparatus has left its fire station, as illustrated in the blue symbols for fire station 15 in Fig. 2. The number 11 displayed in the blue symbol of fire station 12 indicates that the blue apparatus of station 12 has left and that the blue apparatus of station 11 has taken its place at station 12. In case a given piece of apparatus is out of order the number 77 is displayed in the corresponding colored symbol of the station such as shown for the green apparatus for station 10.

The two left-hand columns in the dispatcher's section in Fig. 2 do not have colored symbols but the squares therein have openings through which the numerals on the rotatable drum of an electromechanical device is visible. The numbers displayed in these columns indicate the zones in which the fires are located. According to the dispatcher's section zones 23 and 12 are displayed thereby indicating fires in these zones.

In the first group AA to the right of displayed numerals 2 and 3 the blue symbol has the number 22 therein while the remaining colored symbols are set at zero thereby indicating that the blue apparatus of fire station 22 has been sent to a fire in zone 23.

In the first row DD of the last group number 12 is displayed in the zone columns while the blue, red, green, yellow, and gray symbols of this row display the numbers 12, thereby indicating that the blue, red, green, yellow, and gray apparatus of station 12 has been sent to a fire in zone 12. In the second row DE the blue, red and green symbols display the numbers 15, thereby indicating that the blue, red, and green apparatus of fire station 15 has also been sent to a fire in zone 12.

In the third row DF, the blue and red symbols display the numbers 13, thereby indicating that the blue and red apparatus of fire station 13 has also been sent to a fire station in zone 12.

Figure 3:
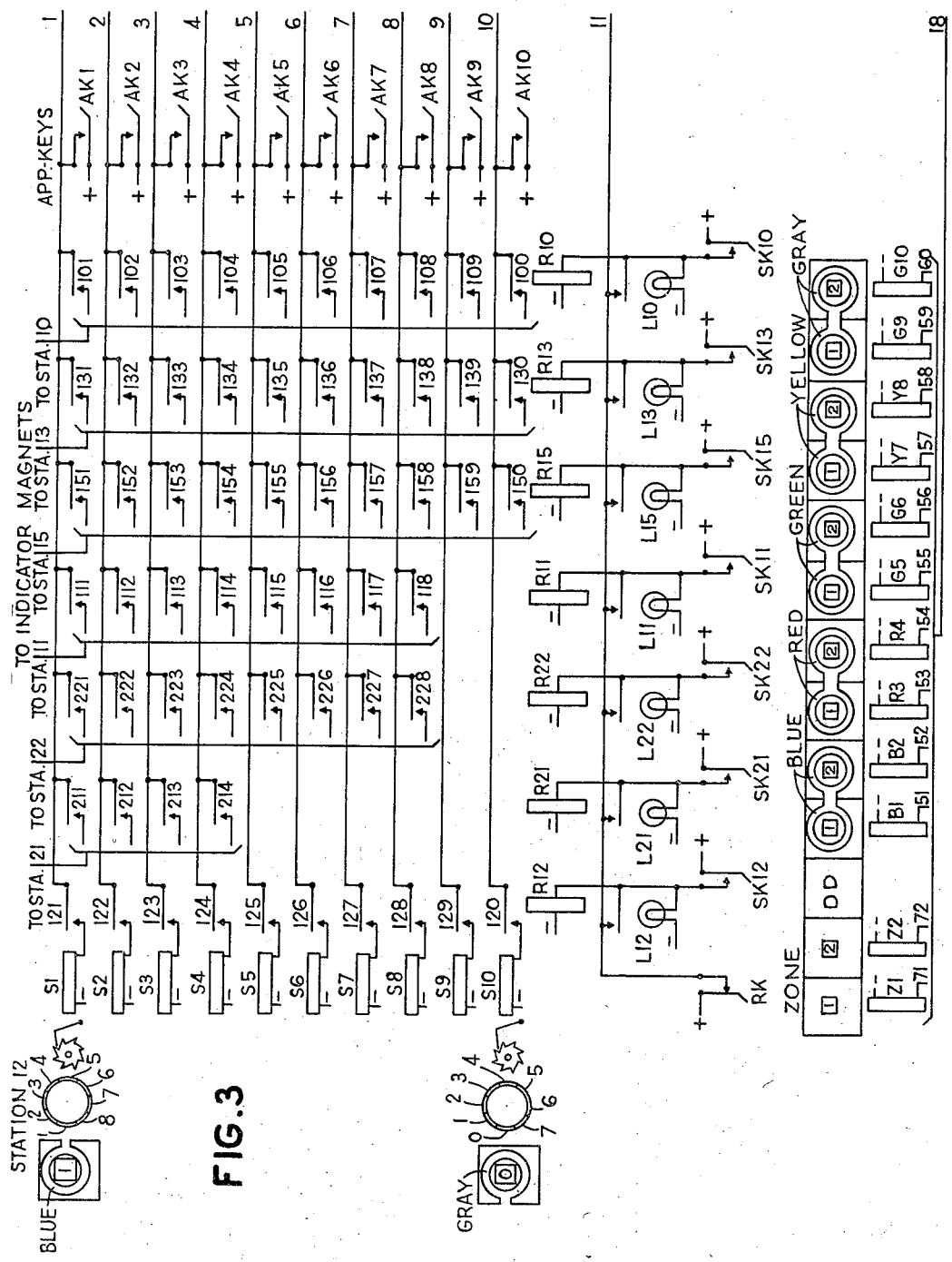
Figs. 3 and 4 show the detail circuit connections for operating the different symbols on the panel to display digits.

In the upper left-hand corner of Fig. 3 is shown a diagrammatic representation comprising the painted square or escutcheon, the rotatable drum, the ratchet, armature and pawl, and the indicator magnet S1 of the first blue symbol in station 12. Each of the remaining indicator magnets S2 to S10, inclusive, for station 12 control similar mechanism to display a numeral through the square hole in the painted symbol escutcheon. The mechanism controlled by the indicator magnets is similar to that disclosed in the aforementioned Obergfell patent. The bracketed conductors extending to the top of the drawings extend to similar indicator magnets at the remaining stations. A group of station relays R12 to R10, connect the apparatus keys AK—1 to AK—10, inclusive, to the respective indicator magnets of such stations when the corresponding station key is operated. A group of station keys SK12 to SK10 and a release key RK are shown associated with the station relays for controlling such relays. A lamp is also associated with each station key to indicate the operated condition of each station relay.

At the bottom of Fig. 3 is shown the symbols of group DD of the dispatcher's section together with the indicator magnets associated therewith.

Figure 4:
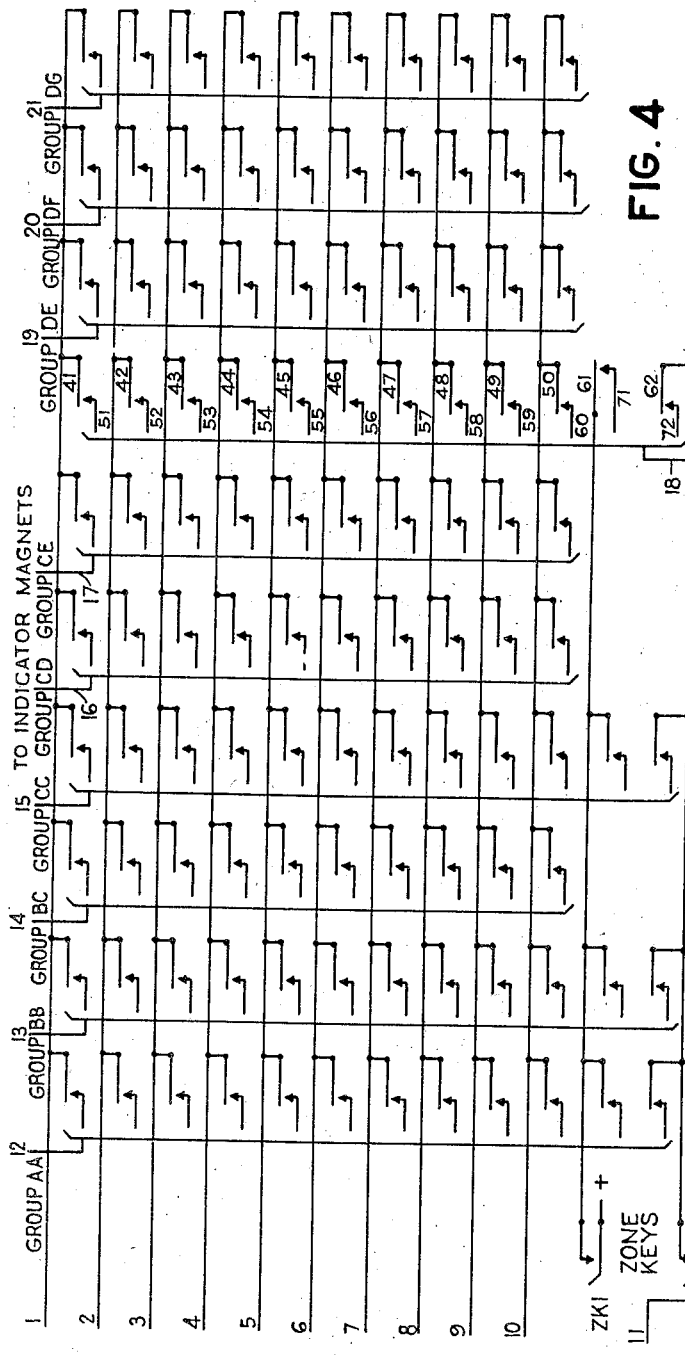
Figure 4:
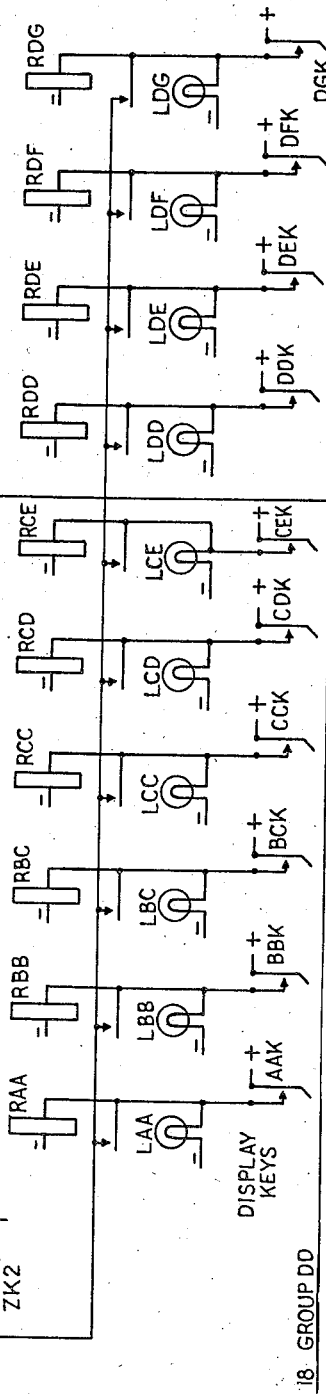

In the lower portion of Fig. 4 is shown the dispatcher's display keys AAK to DGK which when operated control the operation of corresponding relays RAA to RDG. Relays RAA to RDG, when operated, operatively connect the indicating magnets associated with the symbols in the dispatcher's section to the apparatus keys in Fig. 3 and the zone keys in Fig. 4 as illustrated by cable 18 for the group DD. A lamp is associated with each relay to indicate to the dispatcher the particular set of indicating magnets connected to the apparatus keys. The above arrangement therefore shows a coordinate relay selective scheme for selecting and operating the different indicating magnets.

Having given a description of the apparatus and drawings, a detailed description will now be given of the different circuit operations for enabling the dispatcher to operate the display board. For this purpose it will be assumed that each piece of fire-fighting apparatus is in its home position. Each symbol will then display the number of the station within which it appears, and the symbols of the dispatcher's section will all be set to display zeros. It will now be assumed that a fire is reported by telephone to the dispatcher from zone 12, whereupon the dispatcher orders all of the apparatus of station 12 to go to the location of the fire. After transmitting this order the dispatcher operates the station key SK12 assigned to station 12 at his position thereby completing a circuit for energizing station relay R12 from grounded battery through key SK12 and through the winding of relay R12 to negative battery. At its lower armature relay R12 completes a locking circuit for itself from grounded battery at the normally closed release key RK over an obvious circuit. Lamp L12 associated with key SK12 is maintained illuminated from grounded release conductor 11 through the lower armature of relay R12 and through the filament of lamp L12 to negative battery. At its upper armatures 121 to 120, inclusive, relay R12 operatively connects the indicating magnets S1 to S10, inclusive, associated with station 12 to the apparatus keys AK—1 to AK—10, inclusive. Since the dispatcher has ordered all of the equipment from station 12 to proceed to the fire the dispatcher will now operate the apparatus keys in order to cause the symbols to display the digit 0. In response to the operation of key AK—1 a circuit is completed from grounded battery and key AK—1 by way of armature 121 and through the winding of indicating magnet S1 to negative battery. Magnet S1 energizes and operates its armature preparatory to rotating the numbered drum by way of the ratchet shown. Upon each release of key AK—1 indicating magnet S1 deenergizes and advances the drum one step. The dispatcher continues to operate key AK—1 in this manner until zero is visible in the first blue symbol in station 12. In a similar manner the dispatcher operates the remaining apparatus keys to cause all of the symbols in station 12 to display the numeral 0. When all of the symbols in station 12 are set at zero position the dispatcher will operate the release key RK to open the locking circuit of station relay R12 and the circuit to lamp L12 thereby deenergizing relay R12 and extinguishing the lamp L12. The symbols in station 12 now indicate that the blue, red, green, yellow, and gray fire-fighting apparatus of station 12 are no longer at such station.

As the fire is in a congested district the dispatcher desires to set the display on the DD section of the dispatcher's section. The dispatcher now operates the display key DDK, thereby completing a circuit for energizing relay RDD from positive battery through the key DDK and through the winding of relay RDD. At its lower armature relay RDD completes a locking circuit for itself from the grounded release conductor 11 and also completes a circuit for illuminating lamp LDD associated with the operator's key. In response to the operation of relay RDD the zone keys ZK1 and ZK2 and the apparatus keys are associated with the indicating magnets associated with the group DD shown in Fig. 3 by way of cable 18. The dispatcher now operates the zone key ZK1 and zone key ZK2 to cause the zone indicators to display the numeral 12, thereby indicating that there is a fire in zone 12. The circuit for operating the zone indicating magnet Z1 may be traced as follows: from grounded battery by way of operator's key ZK1, armature 61, conductor 71 included in cable 18 and through the winding of relay Z1 to battery. In a similar manner to that previously described each release of the zone key ZK1 deenergizes zone indicating magnet Z1 to step the drum in the left-hand zone column to display a new number. The dispatcher continues to operate the indicating magnet Z1 until the numeral 1 is displayed. In a similar manner over a circuit including zone key ZK2, armature 62, and conductor 72, the zone indicating magnet Z2 is operated to cause the numeral 2 to be displayed in the second zone column. After setting the zone indicators in accordance with the zone the fire is in, the dispatcher then operates the apparatus keys to cause the blue, red, green, yellow, and gray symbols in group DD to display the numeral 12 thereby indicating that the five different pieces of fire-fighting apparatus have been sent from station 12 to a fire in zone 12. The circuit for energizing the first indicating magnet B1 may be traced as follows: from positive or grounded battery by way of apparatus key AK—1, conductor 1, armature 41, conductor 51, by way of cable 18 and through the winding of indicating magnet B1 to negative battery. In a manner similar to that previously described the dispatcher operates the apparatus key AK—1 until the numeral 1 is displayed to the first blue symbol. In a similar manner in response to the operation of key AK—2 the second indicating magnet B2 is operated by way of armature 42, conductor 52 and cable 18 to display the numeral 2 in the second blue symbol in group DD. In a manner similar to that just described the remaining indicating magnets associated with group DD are operated in response to the operations of apparatus keys to display the desired numerals in the symbols shown.

The dispatcher next orders the blue, red, and green apparatus from station No. 11 to move up to station 12, since zone 12 is a congested area. In a manner similar to that just described, the dispatcher, in response to the operation of station key SK11 and the proper corresponding apparatus keys, causes the blue, red, and green symbols in station 11 to indicate zero, thereby reminding the dispatcher that the blue, red, and green apparatus of station 11 have left such station. The dispatcher now operates the release key to cause the disassociation of the indicating magnets of station 11 from the apparatus keys. The dispatcher now operates station SK12 and the proper apparatus keys to cause the blue, red, and green symbols in station 12 to display the numeral 11, thereby reminding the dispatcher that the blue, red, and green apparatus of station 11 has been moved to station 12. The dispatcher now orders the blue and red apparatus of station 10 to move into station 11. In a manner similar to that previously described the dispatcher operates the station key SK10 and the apparatus keys AK1 to AK4 in order to set the blue and red symbols at station 10 to zero position, thereby indicating that the blue and red apparatus are no longer at this station. After the release of the release key RK the dispatcher operates the station key SK11 and the apparatus key AK—1 to AK—4 to cause the blue and red symbols in station 11 to indicate the numeral 10, thereby reminding the dispatcher that the blue and red apparatus of station 10 has been moved to station 11.

It will next be assumed that a fire is reported in zone 23 whereupon the dispatcher orders the blue apparatus of station 22 to go to the location of the fire since in this case zone 23 is an outlying district and has no fire station assigned thereto. The operator now operates the station key for station 22 or SK22 to cause the energization of relay R22 and the lighting of lamp L22 in a manner similar to that described for the other station relays. The dispatcher now operates the apparatus keys AK—1 and AK—2 to operate the indicating magnets associated with the blue symbols at station 22 so as to indicate numeral 0—0 thus indicating that the blue apparatus at station 22 has left that station. The dispatcher then operates release key RK to release relay R22. As this fire is in an outlying district the dispatcher desires to set up such fire on the first or AA display section. The dispatcher accordingly operates the display key AAK to associate the indicating magnets associated with the group AA with the apparatus keys. The dispatcher now operates the zone keys ZK1 and ZK2 to operate the zone indicating magnets associated with group AA to display zone 23 in the dispatcher's section in a manner similar to that previously described. The dispatcher now operates the apparatus keys AK—1 and AK—2 to operate the indicating magnets associated with the blue symbols in group AA to display the numeral 22, thereby indicating that the blue apparatus of station 22 has gone to a fire in zone 23.

It will now be assumed that a second call comes in from the fire in zone 12 and that the dispatcher orders the blue, red, and green apparatus of station No. 15 to go to that fire. The dispatcher accordingly operates the station key SK15 to operate station relay R15 which at its upper armatures connect the indicating magnets associated with station 15 to the apparatus keys and at its lower armature locks itself energized and maintains the lamp L15 illuminated. The dispatcher now operates the apparatus keys AK—1 to AK—6 to operate the corresponding indicating magnets associated with the blue, red, and green symbols of station 15 to display 0—0, thus setting up a reminder on the display panel to the dispatcher that the blue, red, and green apparatus of station 15 is not at its home position. The dispatcher now operates the release key RK to deenergize RI5 and extinguish the lamp LI5. As this additional apparatus from station 15 is sent to the fire in zone 12 the dispatcher will set up this display on the group DE. The dispatcher accordingly operates the key DEK to energize relay RDE and illuminate lamp LDE. By the operation of relay RDE the indicating magnets of the symbols in the DE group are now operatively connected with the apparatus keys. In a manner similar to that described the operator now operates the apparatus keys AK—I to AK—6 to operate the indicating magnets of the blue, red, and green symbols to indicate the numeral 15 thereby setting up a reminder on the dispatcher's section of the display panel that the blue, red, and green apparatus of station 15 has also been sent to the fire in zone 12.

In case a third alarm comes in from the fire in zone 12 the dispatcher orders the blue and red apparatus from station 13 to go to the fire. The dispatcher accordingly operates the station key SK13 to energize station relay RI3 and lamp LI3. Relay RI3 at its lower armature locks to the grounded release conductor II and at its upper armature connects the indicating magnets associated with the symbols at station 13 to the common apparatus keys. Since the dispatcher has ordered the blue and red apparatus from station 13 to proceed to the fire in zone 12, apparatus keys AK—I to AK—4, inclusive, are operated to in turn operate the indicating magnets associated with the blue and red symbols in station 13 until such symbols display the digits 0–0 and 0–0. The dispatcher now operates the release key RK to deenergize relay 13 and extinguish lamp LI3. Since the blue and red apparatus of station 13 has been ordered to the fire in zone 12 the dispatcher will operate the display key DFK to operate relay RDF and lamp LDF. In a manner similar to that previously described relay RDF locks through its lower armature, maintains the lamp LDF illuminated, and at its upper armatures operatively connects the apparatus keys with the indicating magnets associated with the symbols of group DF by way of the ten-conductor cable 20. The dispatcher now operates apparatus keys AK—I to AK—4, thereby operating the corresponding indicating magnets associated with the blue and red apparatus symbols in group DF to display the numeral 13. By the operation of the release key RK ground is removed from the release conductor II, thereby opening the circuit to relay RDF and the circuit to lamp LDF.

The dispatcher's section has now been set as is shown in Fig. 2, to indicate that there is a fire in zone 23 and that the blue apparatus at station 22 is at such fire. The dispatcher's section also indicates that the blue, red, green, yellow, and gray apparatus of station 12, the blue, red, and green apparatus of station 15, and the blue and red apparatus of station 13 is at a fire in zone 12. The different stations now indicate the presence or absence of different pieces of apparatus thereat. For instance, station 21 indicates in Fig. 2 that the blue and red apparatus is at its home station; station 15 indicates that the blue, red, and green apparatus is absent, while the yellow and gray are at home position; station 10 indicates that the blue and red apparatus are absent, the green apparatus is out of order as indicated by the numeral 77, while the yellow and gray apparatus are at home position; station 13 indicates that the blue and red apparatus is absent while the green, yellow and gray apparatus are at home position; station 22 indicates that the blue apparatus is absent while the red, green, and yellow apparatus is at home position; station 12 indicates that the blue, red, green, yellow, and gray apparatus of station 12 is absent, while the blue, red, and green apparatus of station 11 has been transferred to station 12; and station 11 indicates that the blue, red and green apparatus of station 11 has left such station, the yellow apparatus is at home position, while the blue and red apparatus of station 10 has been moved to station 11. The dispatcher or fire marshal at any time of the day by consulting the display panel can ascertain the exact location of each piece of mobile fire fighting apparatus.

In case a system of this type were used for a metropolitan police department then the display panel would represent the metropolitan area which would also be divided into zones taken care of by local police stations therein. In this case the different colored symbols may be used to designate squad cars, patrol wagons or even different units of personnel. The dispatcher's section in this case would indicate to what point or zone the different types of apparatus and units of certain stations have been sent to.

In case a system of this type was used for military maneuvers the mimic map may be used to illustrate the sea-coast in case of naval maneuvers or a battlefield of a country. In naval maneuvers the different colored symbols may be used to designate mobile ships of different types as well as heavy mobile coast artillery. In case of army maneuvers the different colored symbols may be used to designate regiments or divisions, different types of artillery, and other mobile units used in the army.

Having described the invention what is considered to be new and is desired to be protected by Letters Patent is set forth in the following claims:

What is claimed is:

1. In an indicating system, the combination of an animated display board upon which different zones and stations of a metropolitan area are depicted in their relative geographic locations, each station normally containing mobile apparatus, each piece of apparatus having a particular number designation, symbols at each station representing fire fighting apparatus and depicting by a distinctive color the type of apparatus represented, means associated with each symbol for displaying a number designating the identity of the particular piece of apparatus occupying that location at the moment, and electrically controlled means for selecting any of said symbols and for changing the displayed number therein at will to thereby indicate the exact location of every piece of apparatus in the area at all times.

2. In an indicating system, an indicator board having a plurality of sections representing different sections of a metropolitan area, each different section containing fire fighting apparatus and each apparatus of each such section having a particular number designation, a symbol on the board representing each piece of fire fighting apparatus in the area, each symbol having a numerical digit display section, another section of the board having blank symbols representing types of apparatus, electromechanical means for changing the numerical designations of each symbol, a control point for the board before the fire control operator, means controlled at will by the operator for operating said electro-mechanical means to set up numbers on any symbol to indicate thereon, by a code, the numerical designation of any piece of apparatus, thereby indicating the exact location of every piece of apparatus in the area.

3. An indicating board having zone sections representing sections of a metropolitan area, and one common section, a plurality of types of symbols in each section, each type of symbols representing a type of fire fighting apparatus, and each symbol having a numerical designation space, a control point before a fire control operator, electromagnetic means for changing the numerical designations of any symbol controlled from said control point, each piece of apparatus having an assigned code number corresponding to the zone section to which such apparatus belongs, and means controlled by the control operator for at will setting up the code number of any piece of apparatus on a symbol of the type corresponding to the type of apparatus involved to indicate the exact location in the area of every piece of apparatus wherever it may be moved.

HARRY E. HERSHEY.